US010238129B2

(12) United States Patent
Cocchi et al.

(10) Patent No.: US 10,238,129 B2
(45) Date of Patent: Mar. 26, 2019

(54) MACHINE FOR MAKING, DISPLAYING AND DISPENSING ICE CREAM

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days.

(21) Appl. No.: 15/821,048

(22) Filed: Nov. 22, 2017

(65) Prior Publication Data
US 2018/0177210 A1 Jun. 28, 2018

(30) Foreign Application Priority Data
Dec. 23, 2016 (IT) .................. 102016000130582

(51) Int. Cl.
*A23G 9/08* (2006.01)
*A23G 9/12* (2006.01)
*A23G 9/22* (2006.01)
*A47F 3/04* (2006.01)
(Continued)

(52) U.S. Cl.
CPC .............. *A23G 9/227* (2013.01); *A23G 9/08* (2013.01); *A23G 9/225* (2013.01); *A47F 3/0452* (2013.01); *A47F 3/0456* (2013.01); *A47F 3/0486* (2013.01); *A47F 7/0071* (2013.01); *A23G 9/12* (2013.01); *A47F 3/04* (2013.01); *A47J 43/282* (2013.01)

(58) Field of Classification Search
CPC ....... A47F 3/0452; A23G 9/227; A23G 9/225; A23G 9/12; A23G 9/08
See application file for complete search history.

(56) References Cited

U.S. PATENT DOCUMENTS

2010/0175390 A1 7/2010 Jejcic
2013/0269381 A1* 10/2013 Cocchi ...................... A23L 3/36
62/246
(Continued)

FOREIGN PATENT DOCUMENTS

EP 2242376 A1 10/2010
EP 2649886 A1 10/2013
EP 3036998 A1 6/2016

OTHER PUBLICATIONS

Italian Search Report dated Jul. 31, 2017 for counterpart Italian Application No. IT 201600130582.

*Primary Examiner* — Elizabeth J Martin
(74) *Attorney, Agent, or Firm* — Shuttleworth & Ingersoll, PLC; Timothy Klima

(57) ABSTRACT

A machine for making and dispensing liquid or semi-liquid products comprises, in combination: a plane element with an opening made in it; at least one container adapted to contain a basic mixture provided with an opening and inserted in the opening of the plane element; a stirrer and a refrigeration system, operatively associated with the container respectively for mixing the basic mixture and for cooling the basic mixture in such a way as to convert it into finished product; a flange which can be coupled to the plane element; means for coupling the flange to the plane element; a lid movably connected to the flange to close the opening of the container in use.

15 Claims, 4 Drawing Sheets

(51) Int. Cl.
*A47F 7/00* (2006.01)
*A47J 43/28* (2006.01)

(56) References Cited

U.S. PATENT DOCUMENTS

| | | | | |
|---|---|---|---|---|
| 2015/0223490 A1* | 8/2015 | Cigolini | .................. | A23G 9/12 99/455 |
| 2016/0174594 A1* | 6/2016 | Soffientini | ............. | A23G 9/225 99/455 |

* cited by examiner

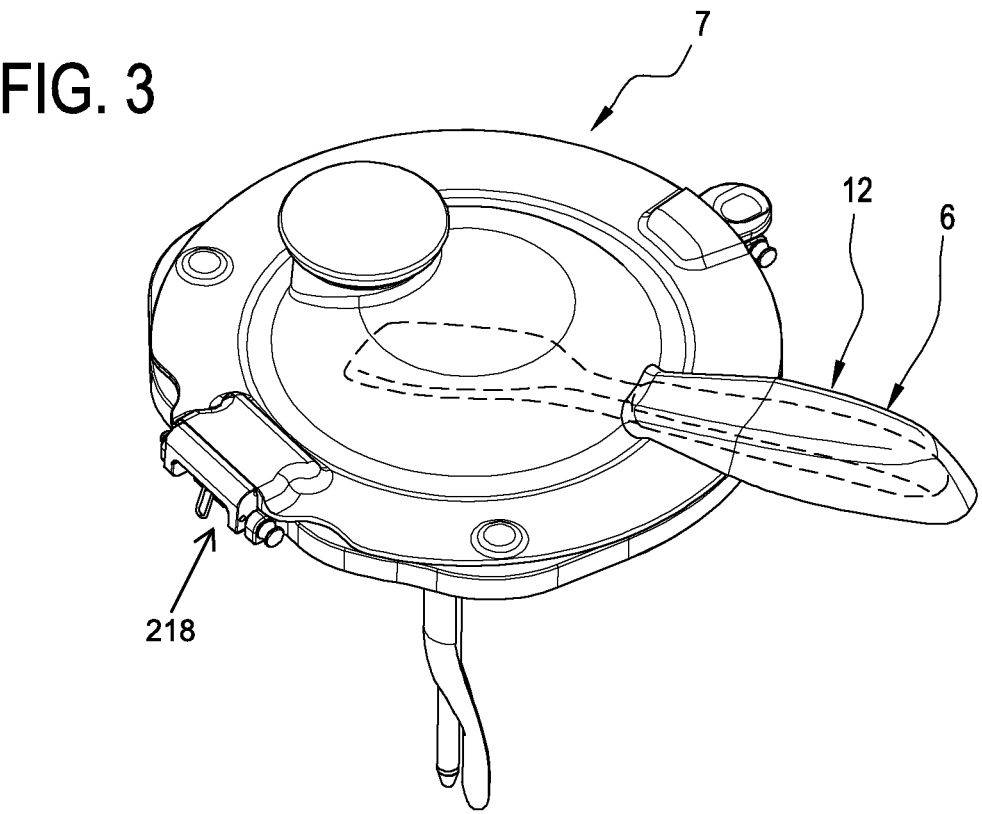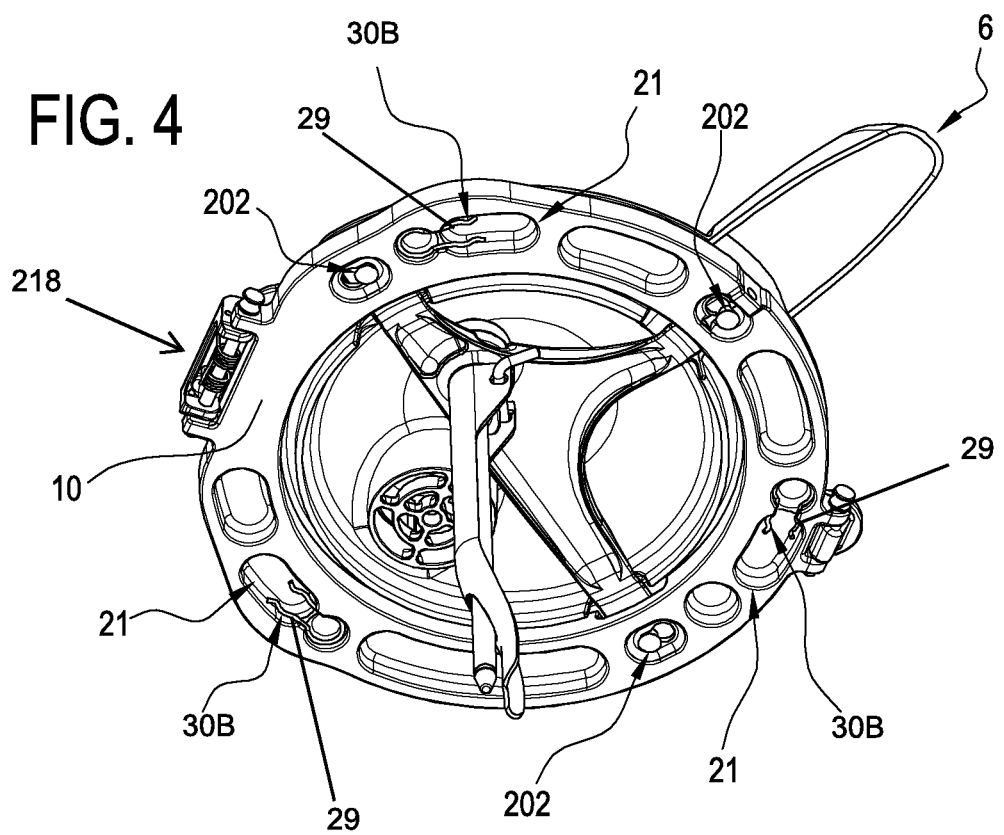

MACHINE FOR MAKING, DISPLAYING AND DISPENSING ICE CREAM

This application claims priority to Italian Patent Application 102016000130582 filed Dec. 23, 2016, the entirety of which is incorporated by reference herein.

BACKGROUND OF THE INVENTION

This invention relates to a machine for making, displaying and dispensing ice cream.

This type of machine is known to experts in the trade by the term "batch freezer-display unit".

As is known, the batch freezer comprises one or more batch freezing tubs, arranged horizontally or vertically, and suitably cooled.

Patent document EP2649886, in the name of the applicant hereof, describes and illustrates a batch freezer and display unit equipped with a plurality of tubs and a refrigeration system to control the temperature during the production and subsequent displaying of the ice cream (where the ice cream is kept inside the same container in which it was made).

This batch freezer and display unit allows making the ice cream and storing it in the same container in which it was made; that means the ice cream trader need not purchase and maintain two separate machines—namely, a batch freezer and a traditional refrigerated display cabinet.

As is known, once the ice cream is made, it is usually served using a scoop which is uniquely associated with one container in order to prevent mixing the content of that container with the contents (usually different) of other containers.

A particularly strongly felt need is that of having a solution which is simple and practical and at once perfectly food safe, allowing the ice cream to be stored and served to customers under hygienic, food safe conditions.

A particularly strongly felt need is that of having a machine which can be cleaned relatively easily.

SUMMARY OF THE INVENTION

The aim of this invention, therefore, is to meet the above mentioned need by providing a machine for making, displaying and dispensing ice cream, which is particularly simple and safe in terms of food safety and which is relatively easy to clean.

A further aim of the invention is to provide a machine for making, displaying and dispensing ice cream which allows the ice creams to be dispensed in a particularly practical manner.

According to the invention, these aims are achieved by a machine forming the object of the invention comprising the technical features described in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

FIGS. 3 and 4 illustrate respective perspective views of the detail of FIG. 2 from different angles;

DESCRIPTION OF THE PREFERRED EMBODIMENTS

Figure 1:
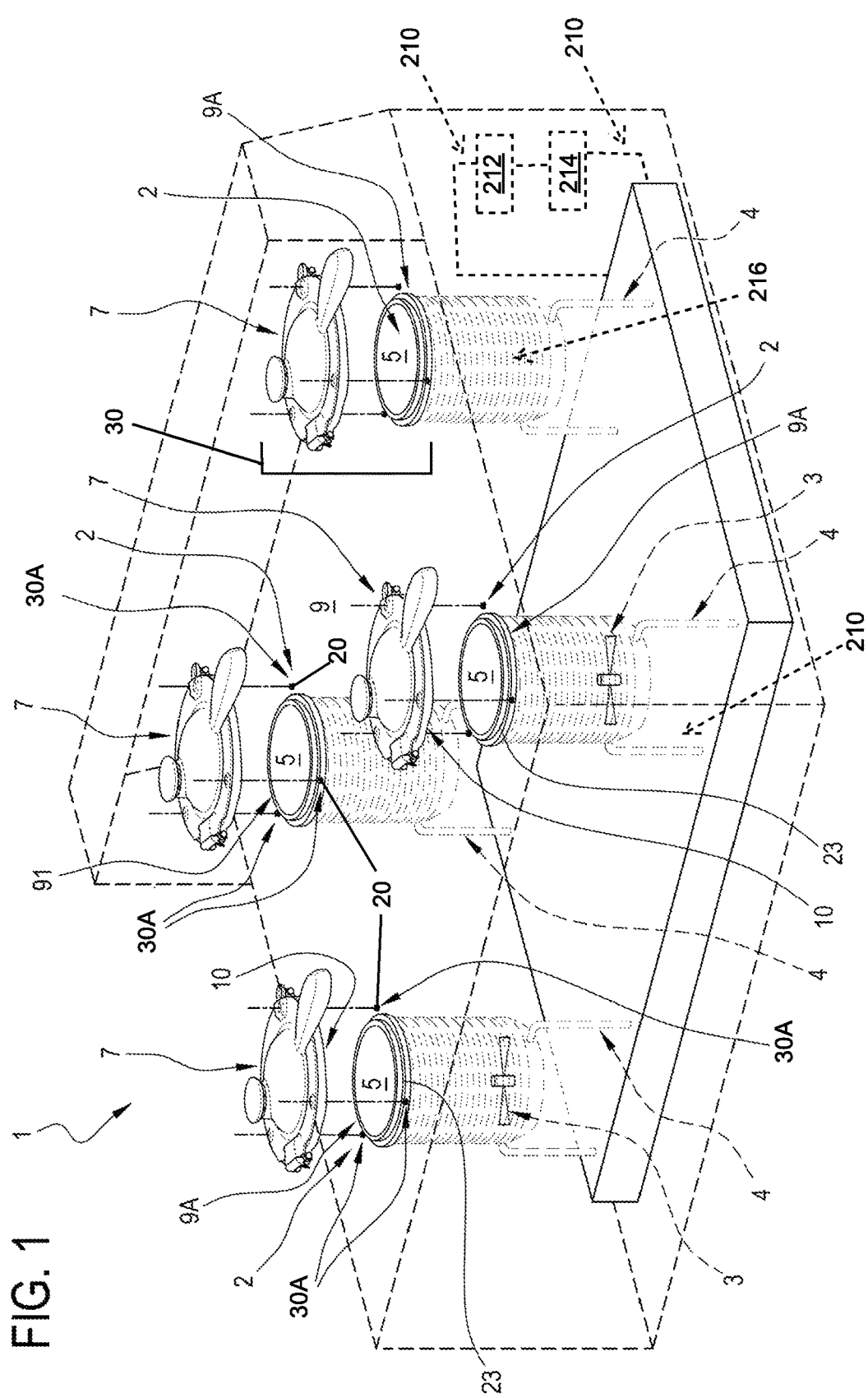
FIG. 1 is a schematic view of a first embodiment of a machine forming the object of the invention, for making and dispensing liquid or semi-liquid products.

With reference to the accompanying drawings, the numeral 1 denotes a machine according to this invention, for making, storing and dispensing liquid or semi-liquid food products.

Preferably, the machine 1 is a batch freezer and display unit, that is to say, a machine designed to allow making the ice cream in a container and storing the ice cream in the same container for dispensing/serving to the end customer.

Described is a machine 1 for making, storing and dispensing liquid or semi-liquid products, comprising:
  at least one container 2 adapted to contain a basic mixture and provided with an opening 5 (for loading the basic product and taking out the finished ice cream, product);
  a stirrer 3 and a refrigeration system 4, operatively associated with the container 2 respectively for mixing the basic mixture and for cooling the basic mixture in such a way as to convert it into finished product;
  a lid 7 operatively associated with the container 2 to close the opening 5.

The machine 1 further comprises a plane element 9 with at least one opening 9A made in it.

It should be noted that the container 2 is inserted inside the opening 9A of the plane element 9.

The machine 1 preferably comprises a plurality of containers 2.

According to this aspect, the plane element 9 comprises a plurality of openings 9A.

The machine 1 further comprises at least one ice cream dispensing scoop 6 provided with a grip portion and a portion for scooping out the finished product.

Each scoop 6 is preferably associated with the container 2.

Preferably, the machine 1 comprises a plurality of scoops 6.

According to this aspect, the machine 1 comprises means 11 for locking the dispensing scoop 6, which are associated with the container 2 and which, in use, allow the dispensing scoop (6) to be held in a rest position.

It should be noted that the locking means 11 are preferably removably associable with the machine 1.

Preferably, the locking means 11 comprise an element which is configured to be coupled with a portion of the scoop 6, in particular with a part of the grip portion, in order to hold it.

The lid 7 comprises a neck 201, an opening 7A through the lid 7 and a removable cap 8A for engaging and closing the neck 201 and opening 7A.

It should be noted that the opening 7A is used essentially to load the basic product (making it possible to load basic products without opening the lid 7).

The machine 1 also comprises:
  a flange 10 which can be coupled to the plane element 9;
  means 30 for coupling the flange 10 to the plane element 9.

The lid 7 is movably connected to the flange 10 to close the opening 5 of the container 2 in use.

More precisely, the lid 7 is movable relative to the flange 10 between two positions: a fully closed position and a fully open position.

Preferably, the flange 10 is an annular flange 10.

More particularly, the annular flange 10 is designed to be removably coupled to the plane element 9.

The means 30 for coupling the flange 10 to the plane element 9 comprise first means 30A connected to the plane element 9 and second means 30B connected to the flange 10, the first and second means 30A, 30B being configured to be coupled to each other.

It should be noted that in FIG. 1, the lid 7 and the flange 10 are shown detached from the plane element, that is to say, not in the operating configuration.

Preferably, the first means 30A connected to the plane element 9 comprise a plurality of pins 20.

The pins 20 protrude from the surface of the plane element 9.

Preferably, the pins 20 extend vertically.

Preferably, the pins 20 are radially disposed at different angular position relative to the axis of the cylinder (vertical).

The second means 30B comprise elastically compliant elements (springs) 29.

Each elastically compliant element 29 is configured to be elastically deformed when one of the pins 20 is inserted into it.

More precisely, the flange 10 has a plurality of recesses 21 on its underside.

The second means 30B are provided in these recesses.

More precisely, the elastically compliant elements 29 are inserted in the recesses.

In one embodiment, the second means 30B comprise fork-like elements 29 (located inside the underside recesses 21) adapted to receive in coupling relationship corresponding portions of the pins 20.

The fork-like elements 29 are elastically compliant to receive in coupling relationship corresponding portions of the pins 20.

More precisely, after being placed in contact with the plane element 9 in the correct angular position, the annular flange 10 is rotated (through an angle less than 10°) in a first rotation direction in such a way as to couple the fork-like elements 29 to the corresponding portions of the pins 20.

The pins 20 are partly inserted into the underside recesses of the flange 10 and the aforementioned rotation causes them to be coupled to the fork-like elements 29.

That way, the flange 10 and the lid 7 are advantageously coupled to the plane element 9, thus closing the container 2.

It should be noted that the lid 7 is preferably connected to the flange 10.

It should be noted that the lid 7 is hinged to the flange 10 by flange 218—that is to say, connected in such a way as to rotate about a fixed axis relative to the flange 10.

To remove the flange 10, the flange 10 is rotated in a second rotation direction, opposite to the first, which allows disengaging the corresponding portions of the pins 20 from the fork-like elements 29.

It should be noted that the container 2 is fixed to the plane element 9.

Thus, removing the flange 10, that is to say, uncoupling the flange 10 from the pins 20 enables the lid 7 to be removed, too: for cleaning purposes, for example.

As may be easily inferred, cleaning the lid in this way is particularly simple.

Preferably, the container 2 has a rim 23 which rests on the plane element 9.

The refrigeration system 4, shown schematically in FIG. 1, comprises a circuit 210 containing a heat exchanger fluid.

The refrigeration system 4 comprises a compressor 212, operatively included in the circuit 210 to compress the heat exchanger fluid.

The refrigeration system 4 also comprises a first exchanger (condenser) 214 and a second exchanger (evaporator) 216 which are operatively included in the circuit 210, the second exchanger 216 being associated with the walls of the container 2.

The refrigeration system 4 also comprises a throttling element, operatively included in the circuit 210 to reduce the pressure of the heat exchanger fluid between a branch upstream and a branch downstream of the throttling element.

The machine 1 also comprises a control and drive unit (electronic control unit) connected to the refrigeration system 4 to regulate the temperature and/or the flow rate and/or the pressure of the heat exchanger fluid.

More specifically, the control and drive unit can regulate one or more parameters of the compressor (power, speed).

The control and drive unit can also regulate the throttling element.

Preferably, the refrigeration system 4 may comprise a thermostatic valve included in the circuit.

According to one aspect of the description, the control and drive unit can regulate the open or closed setting of the thermostatic valve.

It should be note that the machine 1 preferably comprises a plurality of containers 2.

According to this aspect, the machine 1 allows simultaneously processing and/or displaying a plurality of different product flavors (each flavor is processed in a respective container).

It should be noted that according to this aspect, each container 2 has, associated with it, a lid 7, a stirrer and all the other elements described above in connection with the container 2.

As regards the refrigeration system 4, the machine 1 may comprise a single refrigeration system 4 associated with all the containers 2, or it may comprise a plurality of refrigeration systems 4, each associated with one container 2 and independent of the other refrigeration systems.

According to another aspect, the lid 7 has a peripheral protrusion 12 (in the radial or upward direction), the peripheral protrusion 12 being adapted to contain at least part of the grip portion of the dispensing scoop 6.

Preferably, the container 2 is a batch freezing cylinder, having a cylindrical shape.

It should be noted that the processing container 2 preferably has a vertical axis.

It should also be noted that the opening 5 of the processing container 2 is preferably located at the top.

The processing container 2 has a bottom wall and side walls.

With specific reference to the refrigerating circuit, it should be noted that the refrigerating circuit allows cooling the product inside the container to temperatures between −20° C. and −5° C., and more preferably, between −18° C. and −7° C.

Preferably, the control and drive unit comprises an operator interface to allow regulating at least one operating parameter of the machine 1.

Preferably, according to another aspect of the description, the machine 1 comprises at least one temperature sensor 13.

Preferably, the temperature sensor 13 is located inside the container 2.

According to another aspect, the flange 10 comprises a plurality of hollows (cavities) 24 (on the part of it which, in use, faces upwards).

Figure 2:
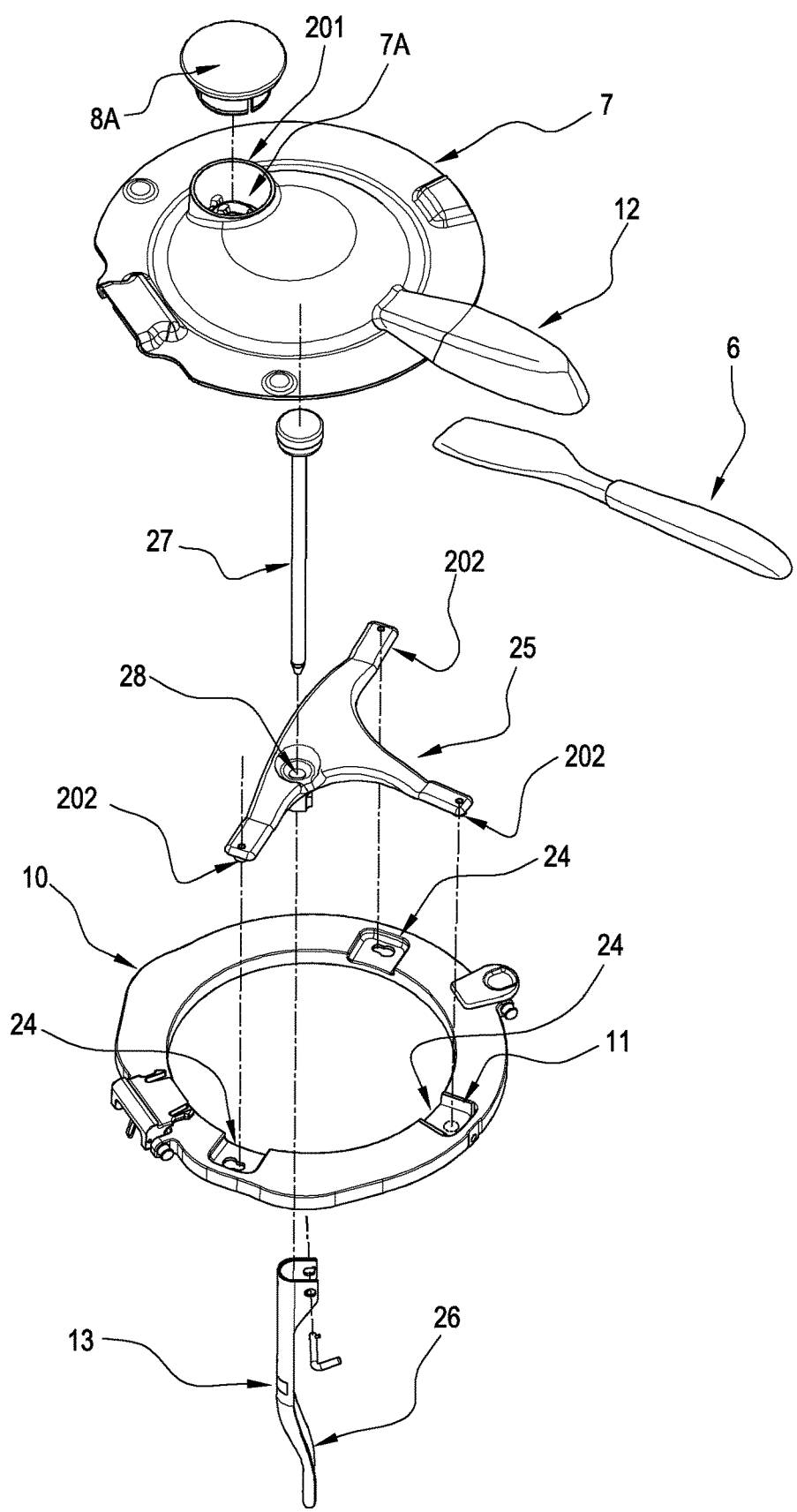
FIG. 2 is an exploded perspective view of a detail of the machine of FIG. 1.

Preferably, the machine 1 comprises a support bracket 25 having portions which are adapted to be inserted into the hollows 24. This includes pins 202 inserted through portions of the hollows 24. See FIGS. 2 and 4.

It should be noted, therefore, that the support bracket 25 is, in use, mounted to rest on the hollows 24.

Preferably, the support bracket 25 has a three-lobed shape and there are three hollows 24. It should be noted, however, that the support bracket 25 might have other shapes and a different number of hollows 24 is also imaginable.

The machine 1 also comprises an elongated arm 26 acting as a counter-stirrer and located inside the container 2.

The elongated arm 26 can be coupled (removably) to the support bracket 25 in such a way that, in use, it is fixed to the underside of the support 25.

More specifically, the elongated arm 26 is coupled to a rod 27, connected to the support bracket 25.

In effect, the support bracket 25 is provided with a hollow 28 into which the rod 27 is vertically inserted.

It should be noted that during operation of the machine, the elongate element 26, or counter-stirrer, is stationary and prevents compact material from building up around the stirrer.

The rod 28 is thus supported vertically by (or connected to) the support 25.

It should be noted that the counter-stirrer 26 comprises a prominent portion which, in use, remains in a fixed position (vertical) relative to the container 2 since it is substantially mechanically connected to and integral with the flange 10.

The elongate counter-stirrer element 26 is designed to prevent a compact block of product from forming around the blades of the stirrer 3; in effect, it allows any blocks of product which stick to the stirrer blades to be detached and stirred back into the product.

Preferably, the temperature sensor 13 may be associated with (fixed to) the elongate element 26.

It should be noted that the signal of the temperature sensor 13 is preferably sent to a control unit which controls the operation of one or more components of the machine 1 (specifically of the refrigeration system 4).

It should be noted that, generally speaking, when the scoop 6 is inside the container, the support bracket 25 and the elongated arm 26 are not used and, vice versa, when the support bracket 25 and the elongated arm 26 are used, the scoop 6 is not used.

The support bracket 25 and the elongated arm 26 (acting as counter-stirrer) are used during production of the ice cream, whilst the scoop is used during subsequent storage/serving.

Advantageously, the solution described in the foregoing is particularly safe in terms of food hygiene: keeping the dispensing scoop 6 at a low, controlled temperature, when it is not being used, reduces the risk of proliferating bacteria on it which would contaminate the product being served to the customer.

It should also be noted that this prevents the product from dripping onto the plane element because the dispensing scoop 6 remains inside the container 2.

The machine 1 allows both making and storing the ice cream inside the container 2.

More specifically, after making the ice cream, the machine 1 keeps it at a predetermined temperature, preferably substantially equal to the (end of) production temperature (or in any case, lower than the production temperature).

It should be noted that in this case, once the ice cream has been made, the user can serve it by opening the lid 7 and using the dispensing scoop 6 mounted inside.

Figure 5:
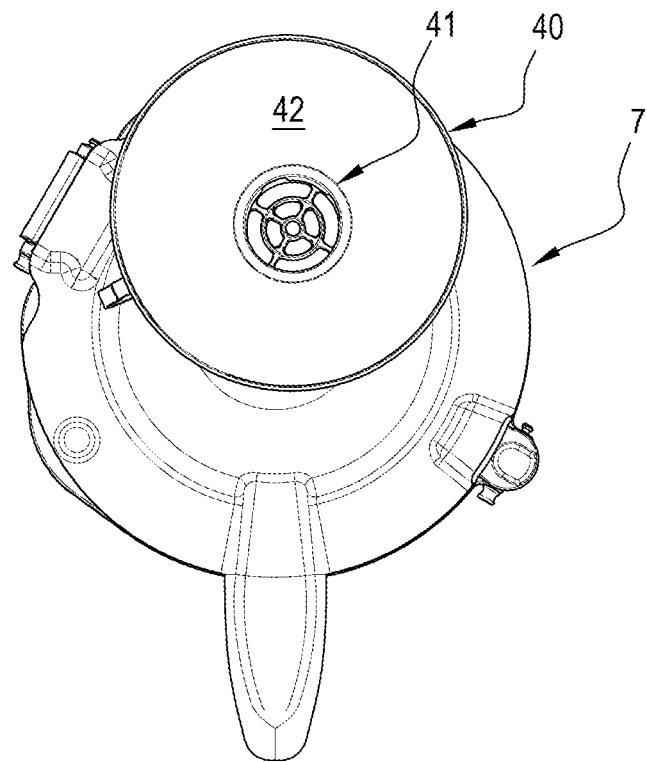
FIGS. 5 and 6 are detail views illustrating another part applied to the machine of the invention.
Figure 6:
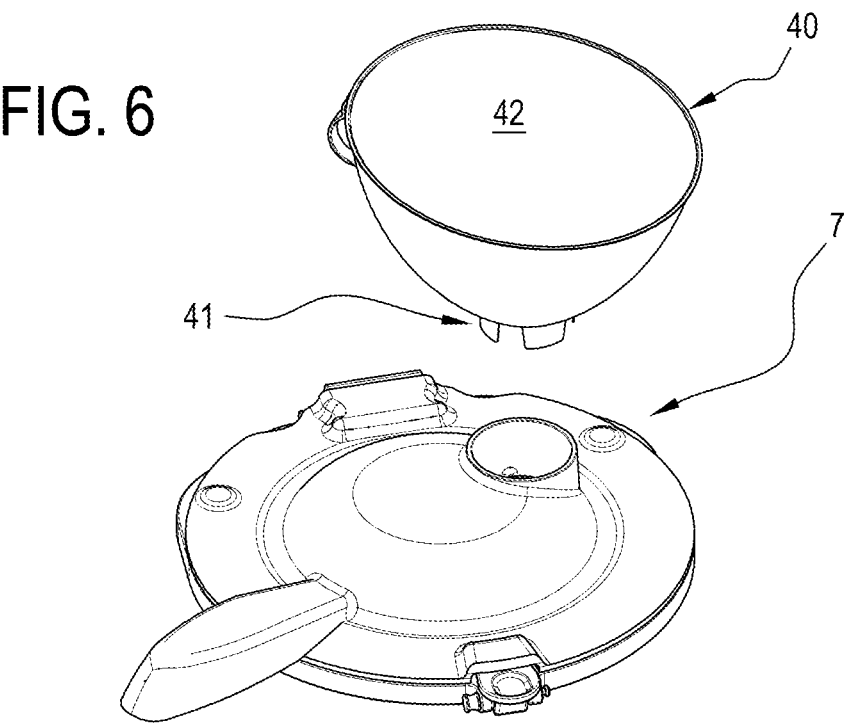

FIGS. 5 and 6 illustrate a device 40—that is to say, a funnel 40—used for filling the basic product into the container.

The device 40 for filling the basic product comprises a portion 42 for containing the basic product and provided with a bottom opening and a neck 41 protruding from the opening.

It should be noted that the device 40 for filling the basic product allows the basic product to be poured into the opening 7A of the lid 7.

Preferably, the device 40 for filling the basic product is made of metallic material.

What is claimed is:

1. A machine for making and dispensing a liquid or semi-liquid product, comprising:
    a wall including an opening;
    at least one container adapted to contain a basic mixture, the at least one container including an opening and being positioned in the opening of the wall;
    a stirrer and a refrigeration system, operatively associated with the at least one container respectively for mixing the basic mixture and for cooling the basic mixture to convert the basic mixture into the liquid or semi-liquid product, the refrigeration system including a circuit containing a heat exchanger fluid, the circuit also including a compressor, a condenser and an evaporator;
    an annular flange including a central opening;
    a coupling device for coupling the annular flange to the wall;
    wherein the coupling device comprises:
        a plurality of pins connected to the wall; and
        at least one spring connected to the annular flange;
        wherein the plurality of pins and the at least one spring are configured to be coupled to each other;
    wherein the at least one spring is configured to be elastically deformed when one of the pins is engaged with the at least one spring;
    wherein the central opening is positioned over the opening of the at least one container when the annular flange is coupled to the wall to allow access through the central opening into the container;
    a lid movably connected to the annular flange to close the opening of the at least one container in use.

2. The machine according to claim 1, wherein the lid comprises an opening and a removable cap for the opening.

3. The machine according to claim 2, wherein the lid further comprises a neck and the opening in the lid is made in the neck.

4. The machine according to claim 1, further comprising:
    an ice cream dispensing scoop including a grip portion and a portion for scooping out the finished product;
    wherein a portion of the annular flange engages and supports the dispensing scoop when the dispensing scoop is positioned under the lid.

5. The machine according to claim 4, wherein the lid has a peripheral protrusion, the peripheral protrusion being adapted to contain at least part of the grip portion of the dispensing scoop.

6. The machine according to claim 1, comprising a support bracket and an elongated arm fixed to the support bracket to act as a counter-stirrer, wherein the annular flange comprises a plurality of upper cavities shaped to receive portions of the support bracket.

7. The machine according to claim 6, wherein the upper cavities include recesses in the annular flange and the support bracket comprises pins adapted to be inserted into the recesses in the annular flange to prevent the support bracket from rotating relative to the annular flange.

8. The machine according to claim 6, wherein the machine comprises at least one temperature sensor associated with the elongated arm.

9. The machine according to claim 1, comprising a funnel for filling the basic mixture into the container, the funnel comprising a bowl portion for containing the basic mixture, a bottom opening and a neck connected to and protruding from the bottom opening, the neck being engageable with the lid.

10. The machine according to claim 1, wherein the at least one spring includes a separate spring for each of the plurality of pins.

11. The machine according to claim 10, wherein at least one of the separate springs is generally U-shaped to engage opposite sides of the respective one of the plurality of pins.

12. The machine according to claim 11, wherein an inner circumference of the annular flange defines an axis of the annular flange and the annular flange includes a recess axially extending through at least a portion of the annular flange to receive the at least one of the separate springs and the respective one of the plurality of pins.

13. The machine according to claim 12, wherein the recess is shaped to engage and hold in place the at least one of the separate springs.

14. The machine according to claim 1, wherein an inner circumference of the annular flange defines an axis of the annular flange and the annular flange includes a recess axially extending through at least a portion of the annular flange to receive the at least one spring and at least one of the plurality of pins.

15. The machine according to claim 14, wherein the recess is shaped to engage and hold in place the at least one spring.

* * * * *